Fig. 1.

| | |
|---|---|
| mmmmmmmmmmm | 11 |
| i n t e r e s t i n g | 11 |
| interesting | 5 |
| dddd m | 5 |

T h e N e w L o o k o f T y p i n g
The New Look of Typing
MMMMMMMMMMMMMMMMMMMMM

| | | | |
|---|---|---|---|
| mmmmm | 5. mmmmmmmmmm | 10. mmmmmmmm | 8 |
| t h i n g | 5. p e r m i l l e - | 10. p e r c e n t | 8 |
| thing | 2. per mille | 5. per cent | 4 |
| d m | 2. m l ddd | 5. m l l m | 4 |

Fig. 2.

MMM i i i mmw w v v v v v v v v vww mm i i i MMM
C a p a c i t y f o r c r e a t i v e t h i n k i n g
Capacity for creative thinking is a relatively rare inborn talent ...essential in original research. Advances in scien
Journal of the Electrochemical Society Baltimore March. 1948.
J o u r n a l o f t h e E l e c t r o c h e m i c a l

Fig. 3.

| | |
|---|---|
| mmmmmmmmmmmmmmmmmmmmmmmmm | 25 |
| u n e p r i è r e c o n f i d e n c i e l l e | 25 |
| une prière confidencielle | 11 |
| m l m m l m l d d d m | 11 |
| a r g e n t i n i a n a. s t e r b a s z c z e r b a. | 8 |
| argentiniana sterba szczerba | 3 |
| d l m d l m d d d m d d | 3 |
| M e n s c h a e r g e r e d i c h n i c h t | 25 |
| Mensch aergere dich nicht | 15 |
| l d m l d l d d l l m l l m l | 15 |
| haftpflichtversicherung | 10 |
| H a f t p f l i c h t v e r s i c h e r u n g | 23 |
| m d l m l m l m d m | 10 |
| mmmmmmmmmmmmmmmmmmmmmmm | 23 |

Inventor
Stanisław W. Szczepanowski

Inventor
Stanisław W. Szczepanowski

April 24, 1956 S. W. SZCZEPANOWSKI 2,742,998

IMPROVEMENTS IN TYPEWRITERS, IN TYPES AND IN AFFILIATED APPLIANCES

Filed Dec. 5, 1949 4 Sheets-Sheet 3

Inventor

Stanisław W. Szczepanowski

Fig. 10.
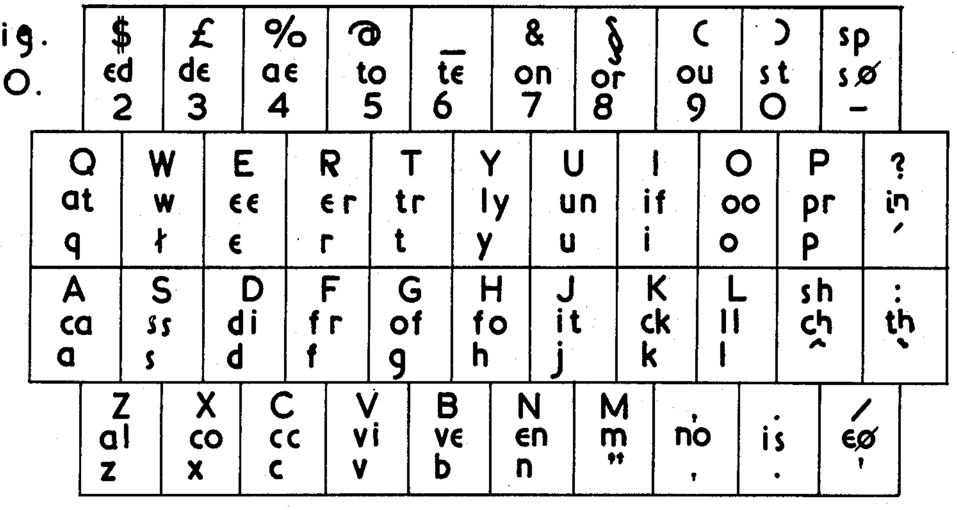
Fig. 11.
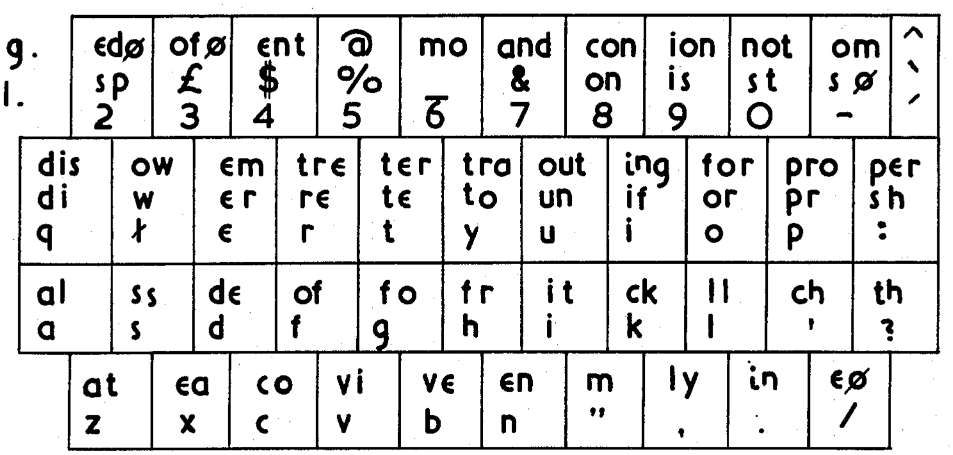
Fig. 12.
| 500words | in | th | eø | sø | ch | sh | st | is | it | tr | toø | ing |
|---|---|---|---|---|---|---|---|---|---|---|---|---|
| American | 75 | 61 | 79 | 53 | 15 | 7 | 18 | 15 | 17 | 4 | 14 | 16 |
| British | 47 | 68 | 102 | 52 | 10 | 4 | 12 | 13 | 4 | 7 | 7 | 8 |
| 1000 words | 122 | 129 | 181 | 105 | 25 | 11 | 30 | 28 | 21 | 11 | 21 | 24 |
| per mille | 20 | 21 | 30 | 17 | 4 | 2 | 5 | 5 | 3½ | 2 | 3½ | 4 |
| 500words | erø | ofø | for | con | co | on | ion | ed | edø | en | un | no |
|---|---|---|---|---|---|---|---|---|---|---|---|---|
| American | 14 | 26 | 4 | 3 | 8 | 21 | 2 | 13 | 13 | 23 | 5 | 3 |
| British | 22 | 14 | 6 | 5 | 8 | 17 | 3 | 23 | 22 | 17 | 4 | 2 |
| 1000 words | 36 | 40 | 10 | 8 | 16 | 38 | 5 | 36 | 35 | 40 | 9 | 5 |
| ‰ | 6 | 6½ | 2 | 1⅓ | 3 | 6 | 1 | 6 | 6 | 7 | 1½ | 1 |
Inventor
Stanisław W. Szczepanowski 2,742,998
Patented Apr. 24, 1956

2,742,998

IMPROVEMENTS IN TYPEWRITERS, IN TYPES AND IN AFFILIATED APPLIANCES

Stanislaw Wiktor Szczepanowski, London, England

Application December 5, 1949, Serial No. 131,131
10 Claims. (Cl. 197—7)

Figure 4:
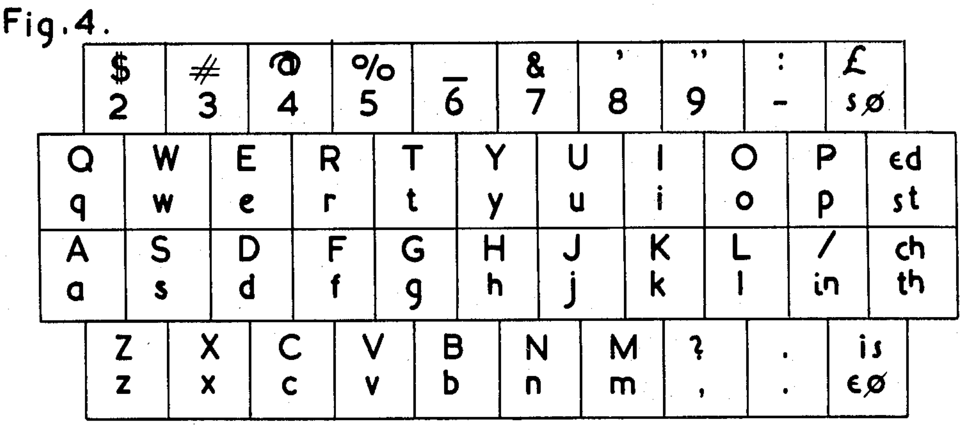

This invention relates to improvements in modern typewriters—for visible writing—of typescripts in Latin characters, as it is conventional in the western world, and is especially concerned with novel features of type-bars, with type-faces on them, for small Latin letters or combinations thereof—considered as tools—and with their arrangement in connection with the keyboard and with known mechanisms for a variable spacing.

The invention relates also to improved means for combining features mentioned above with printing at will, at a single action on a key-cap in the keyboard, either of single letters or of compound characters consisting of a plurality of letters or of letters and free spaces; a tempting idea which was already previously described—in principle—but did never prevail—in practice—as improvements were still missing whose introduction is the main purpose of this, my invention.

The invention relates as well to means for such a manner of typewriting as to permit its product—the typescript —to be compressed in width, more letters to the inch, with an undiminished or even an improved legibility, and especially to means for producing of clear carbon copies of such typescripts which are compressed in width.

Thus, the aim of this, my invention is to achieve, on the one hand: economy in time, and on the other; economy in space, or to combine both. In the following text I call it "tachygraphy," "tachygraphic arrangements" and "tachygraphic effects."

Already since the early days of typewriting it has been proposed to use compound characters, and numerous constructions of appropriate escapement mechanisms were invented. In order to indicate what I presume as known prior to my invention, I give the following extract of essential features from previous specifications.

In a specification of A. D. 1886 is has been proposed to provide a variable spacing adapted to the width of particular characters, single-letter characters or such compound characters as the "the." The mechanisms for variable spacing, we would call it now escapement mechanisms, were described in that specification—of A. D. 1886 —in application to the complex construction of the "Remington" typewriting machines, for invisible writing, as they were in that early stage. On the typebars there had to be characters of the "lower case" and of the "upper case," the latter mainly for compound characters. Shift keys for shifting the "cases" were provided, and means for imparting to the carriage, not only the usual space movement, but also an extra movement of one, two, or three teeth. These escapements could be varied for each finger-key and be different for each "case." An additional key was provided which, when depressed, caused an extra space to appear between every two letters. Such an additional key could be held down by a suitable catch.

In a specification of A. D. 1894 it has been proposed —also for an old-fashioned typewriter with invisible writing—to provide spaces between characters corresponding with the various widths of the particular character, moreover to permit of the employment of "logotypes" for short, frequently occurring combinations of characters. Appropriate means for that purpose—escapements—were described there, consisting of a combination of slip racks, letter-space dogs, rocking shafts and rocking arms, operated by depression of key levers.

In a specification of A. D. 1896 it has been proposed to have in a typewriting machine—still for invisible typing, by type-faces resting on an ink-pad frame—different sets of type-bars, the type-bars of one set being provided with single characters, the type-bars of the other set being provided with duplex or multiple characters, on their printing points, such as "an," "as," "is," and so on. The escapement device had to be so constructed as to feed the carriage different distances corresponding to the space required by the characters appearing on the type-bar which is operated.

In a specification of A. D. 1898 it has been proposed to provide electric-operated means, with magnets, for performing the usual mechanical movements necessary for printing, and in particular for bringing the type-faces needed to the active, or "impression" position. Therefore the keyboard could be in a distance from the place where the printing of types is performed. Three "cases" of characters—called "fonts"—were provided in this way that on each type-bar three type-faces appeared. One of them had to be brought to the impression position, by means of shifting keys. Type-bars could be brought to that active position one at a time, or two, or three at a time, in order to print—simultaneously— also combinations of two or three characters. It was claimed that the invention made visible writing possible.

In a specification of A. D. 1904 it has been proposed to provide, in a typewriter, an escapement wheel having a plurality of sets of teeth, independent releasing members therefor, and special actuating keys for successively operating said release members. That escapement mechanism had to serve the purpose of shifting in a double spacing when required for typing—simultaneously—either a combination of two letter-characters or of one letter-character with the following free space. The typewriter had to be provided with two sets of keys and of type-bars, one set to carry single characters in the normal position, and the other set having its imprinting type-face at a point one space to the rear. If two keys, each one belonging to one of the two sets, were depressed simultaneously, the imprint of a combination of the two letters could be printed, and the escapement mechanism provided the necessary double spacing.

In a specification of A. D. 1904, still for the invisible writing, a typewriting machine was proposed with two sets of single-letter type-faces, arranged below the platen, on levers resting on inking pads. The machine was available for printing in two sets of characters so that part of the matter written may be, if necessary, in the larger characters and a part in smaller ones. In the drawing of that specification both sets of characters were capitals, differing one from the other in their size. Type-blocks for both sets of characters are of the same size, only the width of the type-faces differs. A letter-space feed mechanism was provided for affording a different extent of letter-feed for the types of each set, the varying of space being controlled by a hand-actuated shift lever.

In some specifications of A. D. 1908, and again in 1914, relating to typewriters equipped with pivotally mounted type-bars, it has been proposed to add to the customary single-letter keys, on the keyboard, any plurality of supplemental rows of keys for printing, by a single stroke, either two-letter characters or even three-letter characters. New models of escapements or feed mechanisms, for the carriage carrying the platen, were proposed, so arranged that the depression of any of the usual keys will feed the carriage the distance of the ordinary space, while the depression of a plural-letter key will feed the carriage two or more spaces, according to the number of letters or characters, or characters and free spaces, on or represented by such a plural-key. Several mechanisms were described serving that purpose. Some of these mechanisms could be used as an atachment to ordinary typewriters.

In a specification of A. D. 1909 it has been proposed to add to the basket of single-letter types—for invisible typing—means adapted to print combined characters of two or three letters, or letters with a following space. Two such combined characters were provided on each type-head, so that the upper combined characters may be printed by the use of the ordinary shift key. Appropriate additional escapements were provided for giving to the platen a space movement adapted to the length of any particular combined character.

In a specification of A. D. 1910 it has been proposed to arrange pivotally mounted type-bars vertically, on a circular line before the printing point in such a way that the customary single letter type-bars occupy the centre and, on both opposite sides, type-bars are added carrying syllables or other combinations of characters. These additional type-bars were also provided with lugs, acting on corresponding universal rails or bars, and actuating the escapement of the carriage in such a manner that the necessary varied spacing was achieved, corresponding to the respective number of characters on the type-bar.

In a specification of A. D. 1923 it has been proposed to actuate by each key on the keyboard three sets of characters—in three levels—whose type-faces were arranged on type-bars, one of each set on each type-bar. The operation of each level of characters was controlled at will by shift keys. In the uppermost level of characters the customary set of single small letters appeared, in the lower "case" the capitals and the numerals, in the lowest "case"—a set of combined three-letter-characters. When that lowest "case" was shifted in, an appropriate escapement, for a spacing corresponding to the number of characters, became operative, whose construction was described in detail.

A specification of A. D. 1932 relates to a typewriter whose type-faces, letters and combined characters, are formed in circumferential rows upon a cylindrical drum-matrix slidably mounted and rotatably actuated in order to shift the matrix to the desired printing position. The printing of a character on paper is done, by an inked ribbon, when a pivotally mounted hammer strikes a blow against a desired letter or character—through the paper. The specification proposes a mechanism of escapement for automatically varying the space of movement when each letter or character is printed, to conform to the different widths of letters and characters, thus giving to the typewritten matter the appearance and alignment of printed matter.

A specification of A. D. 1939 relates to typewriters for producing typescripts in languages such as Arabic for the characters of which type-blocks of different widths are employed, and the machine is characterised in this that the type-bars, in their rest position, are spaced apart one from another at distances which vary according to the differences in width of the type-blocks carried by them. A new construction of an escapement mechanism is described, which selectively provides a single-letter or a double-letter spacing and is operated by the same shift key which controls selection of "cases."

In a British specification of A. D. 1945, which already ceased to exist as a patent, one variant more was proposed of settable means interposed between the type-bars and the escapement mechanism, for selectively actuating the same in single space intervals—for the lower "case"—and in double space intervals—for the upper "case." The type-bars, called type-levers in that specification, are equipped with two type-faces each. One set of these type-faces, in the "lower case," carry single-letter characters, the other set, in the "upper case," carry pairs of letters. Capital letters only, single or in pairs, are shown in the drawings of that specification.

Prior to this invention possibly also type-faces of some specific letter combinations may have been used, such as abbreviated commercial signs, or symbols, but they did not relate—as far as modern typewriters with a uniform spacing are concerned—to the application of digraphs or multigraphs which appear frequently in the language, as this my invention does.

No novelty is claimed here as far as the application of escapements for varying the spacing, in width, is referred to. Any construction of such escapements, as they were previously described and known, may be used in combination with the novel features of this my invention.

The scope of this invention is limited to improvements on modern typewriters for the Latin alphabet, including small letters, for typing one face at a time, with the conventional number of key-caps on the keyboard—between forty and fifty—each key-cap operating a pivotally mounted type-bar with a type-block on its top, carrying type-faces, in two or in three levels—"cases"—selected for printing by case-shifting keys, whose visible typing is effected, in the customary way, by a centralized impact of type-bars, through a ribbon, on a sheet of paper moved transversely together with the platen roller, at a spacing controlled by action of any sort of known variable or fixed-increment escapement mechanisms.

Wherever the expression "modern typewriters" is used hereafter in the specification, especially in claims, it is understood that this means typewriters as defined above.

Thus, in pursuance of the aim to achieve in typewriting an economy in space combined with an economy in time, the main object of this my invention is to introduce, on modern typewriters for the Latin alphabet, a novel combination of features some of which are new and some were already previously described as parts of old-fashioned typewriters.

The use of these known features is only now rendered practicable and expedient due to their novel joint coaction with novel features in a new combination. In that new combination previously known compound characters—digraphs and so on—also appear, but in a transformed shape and in a new arrangement of coaction producing results superior to those previously known.

Means used for achieving that main object of the invention do not relate to the other way of syllable typing, by touching simultaneously two or more of key-caps, in the keyboard, each of which controls a separate type-bar.

A further object of this my invention, pursued mostly by the same means, is to give a practicable novel expression to the tendency of condensing typescripts—in width—to shorter spaces by putting more small letter-characters to the inch. At present, for obtaining conveniently legible typescripts, a spacing of some ten to twelve letters in the inch is used. A spacing of sixteen, even of twenty letters to the inch, used on some conventional modern typewriters, produces typescripts which are not easily legible, and may become practically illegible on carbon copies.

A further object of this my invention is to provide practicable means for achieving the objects mentioned above, in particular by transforming the shape and the arrangement of type-faces of some small letters—on the type-bars—used in typewriters and also of digraphs and trigraphs, or other combinations of small letters and spaces, in such a novel way that these type-faces—single or combined—become better tools for properly performing their function than customary type-faces do.

The resulting change of the visual outlook of small letters and of combinations thereof, as judged solely by the eye, will certainly be the by-product of the novel manner of producing typescripts, but is not claimed as a part of the invention. That change of the visual appearance, the "new look" or "new style," is rather comparable to that one occurring in the shape and design of airplanes when new aerodynamical constructional principles are introduced.

Another object pursued by the invention is to make type-faces, for modern typewriters, available which are not subject to clogging by being filled up with dirt, to such an extent as the conventionally used type-faces are. Consequently, typewriters on which the invention is applied are easy to clean and may be used for a longer time for producing clear typescript, especially in carbon copies, without the necessity of cleaning the type-faces of the machine's type-bars.

A further object aimed at by the invention is to provide type-faces, for modern typewriters, which can produce better carbon copies, and more of them, copies which are clear and distinctly legible, being unaffected by any swamping over, by the carbon, of spaces inside the contours of letter-characters or of combinations thereof. The difficulty of achieving just this object grows in proportion to the compression—in width—of the typewritten text. The invention has to afford novel means for getting clear and legible carbon copies, even then when texts are compressed in width.

Embodiments of the invention are diagrammatically illustrated, by the way of examples, in the accompanying drawings.

In Figures 1, 2 and 3 specimens of typescripts are shown—diagrammatically—which may be produced on typewriters embodying novel features of the invention, in the novel manner described in this specification.

In Figures 4–11 examples of the application of the invention, on modern typewriters for the Latin alphabet, are shown. In these Figures 4–11 each typewriter is represented, diagrammatically only by its keyboard chart, on which also novel type-faces appear, for some single letters and combinations thereof.

In Fig. 12 examples of proposed digraphs and other multigraphs are shown, for use in the English language, also frequencies of their appearance in average British and American texts.

In Figures 4–11 all such details are omitted in relation to which no novelty is claimed, such details as connections between key-caps and the type-bars, shifting mechanisms, escapement mechanisms and so on. These details are understood to be known from previous specifications or known, and customary, to those skilled in the art.

It is to be understood that each key-cap shown in the keyboard charts in Figure 4–11, actuates by any customary means a pivotally-mounted type-bar, sometimes called "type-lever," carrying on its top a type-block, equipped with such type-faces as they are shown on the key-caps in the drawings. It is understood that each rectangle in the said keyboard charts represents as well the respective type-block, and features of type-faces on particular type-blocks are shown inside said rectangles.

It is also to be understood that all these improved arrangements are made on modern typewriters hereinbefore defined. Known escapement mechanisms are used to provide a conventional uniform spacing for all "cases," all levels of types—in examples shown in Figures 4 and 6, and a varied spacing in examples shown in Figures 7–11, as particularly described below. These escapement mechanisms are actuated by the same shifting keys—not shown in the drawings—which control case-shifting, and are operated by actions on the particular key-caps, as it is conventional in modern typewriters.

Novel features in typewriting, for making—in accordance with the invention—a quicker production of clear and good typescripts practicable, in application to texts compressed in width, consist on the one hand: in novel shapes of type-faces of some "lean" Latin small letters and of combinations thereof—digraphs and other multigraphs—and on the other hand: in novel arrangements for the type-faces, single or combined, novel or customary, on the type-bars, in the "cases" and in the keyboard.

The first step taken, in accordance with the invention, was to accommodate—in modern typewriters of the kind described—type-faces for two "lean" small letters in the width of the type-face of one "fat" small letter—the "m" or the "w." This results in nearly halving the space needed for typescripts, as shown in Figures 1, 2 and 3.

Compression in width of the type-faces of most of the "lean" small letters present no problems, but a merely mechanical compression in width of some of them, such ones in which blank spaces are enclosed or nearly enclosed, at the top and the bottom, by the letter's rounded contours, as the "e," the "s" and the "c," would result in making typescripts, especially carbon copies, nearly or entirely illegible and useless, as all these three letters —with their blank spaces swamped over—would become indistinguishable, especially on carbon copies, from a small "o."

The novel shape given—on type-faces—to these three small letters, and combinations thereof, according to the invention, is shown in the drawings.

The customary shape of a small "e" contains two small spaces which have to remain blank, within its contour. One of these spaces is entirely encircled by the contour, the other is mostly encircled. In typescripts produced on customary modern typewriters, these two blank spaces have the tendency to disappear because the two cavities—in type-faces—of a customary small "e" are soon filled with dirt, and their cleaning with a brush is rather difficult. Even if these type-faces are clean, but more carbon copies are made, these two blank spaces tend to be swamped over, so as not to appear at all in some carbon copies, as the small "e" gets in them the same appearance as the small "o."

The problem of re-shaping the type-face of the small "e" is solved, according to the invention, by halving the customary shape of the typed small "e" and omitting the second half—as superfluous, so that only the left half is still on the type-face. The legibility of this character is not interfered with thereby as the remaining left half resembles the capital "E."

That improved small "e" shape—the halved "e"—has no blank spaces which are encircled, or mostly encircled by the contour. They become open spaces in consequence of having the right half of the letter's contour removed. Consequently, that improved shape of the type-face, even if reduced in width, remains distinctly legible in typescript. Also when carbon copies are made, even numerous ones, they remain clear. As there are no blank spaces enclosed by the contour, the corresponding cavities in the type-face have no more the tendency of being clogged up with dirt, the cleaning of the reshaped type-faces also becomes easier. They may be effectively cleaned with a brush.

The advantageous effect on legibility and clarity of condensed typescripts is demonstrated in Figures 1, 2 and 3. That novel shape, the halved "e," is also shown in Figures 4–11 wherever the shape of a small "e" of a reduced width has to appear.

In the same drawings the novel shape of the type-face for the small "c" is shown, consisting approximately of only a half-circle or half-ellipse, while the customary shape—on type-faces—consists of a nearly full circle or full ellipse. Re-shaping is effected here in the same way as in the instance of the small "e," by cutting away the right half of the customary contour. Analogous advantages are achieved.

The same principles of my invention are applied to the new shape of the type-faces for the small "s," as shown in Figures 2 and 4–12 of the drawings, wherever the shape of a small "s" of a reduced width has to appear. That novel shape of the small "s" type represents still the unmistakable serpent-shape, the origin of that character, but differs from the customary one—as used on typewriters—in that something like a quarter of a circle, or of an ellipse, has been cut away on the top, and likewise, at the bottom, from the customary shape. Moreover, the remainder of the contour is rightened up in the clockwise direction, and its width is thereby reduced. Thus, the novel shape of a small "s" type will be represented by a straight line in the middle, more inclined than in the customary shape, and the two rounded parts, at the top and the bottom, both reduced approximately to a quarter of a circle.

Due to such a re-shaping, blank spaces inside the contour of a small "s" are no more mostly enclosed, like inland lakes or harbours with a narrow entrance. The corresponding cavities in the type-face, representing these blank spaces, resemble rather open bays. Consequently, advantages and effects described above in connection with the re-shaping of the small "e" apply also to the reshaped type-face of the small "s." These type-faces becomes better tools for typewriting in cases where the width of the small "s" is to be reduced.

That simplified shape of the small "s," whose inclusion for use in typewriting is claimed as a novelty, is certainly no novelty in handwriting and—presumably—in printed texts, especially old ones.

Similar principles are applied in this invention to novel shapes of type-faces of some digraphs and trigraphs, in pursuance of analogous effects as those described above.

For instance, the digraph "in" in Fig. 1, at the beginning of the compressed version of the word "interesting," is produced by only mechanically reducing in width the customary space occupied by the two small letters, the "i" and the "n," to the size occupied by a typed small "m." The second version of that digraph "in," at the end of the same word "interesting," shows a re-shaping of its type-face in accordance with this invention.

The first version of the compressed "in" shows two longitudinal narrow spaces, one inside the small "n" and the other between "n" and "i"; they appear on the type-face as two narrow cavities. These two cavities are bound to be easily clogged up with dirt, in the type-face. That dirt will not be easily removed by a brush. Consequently, the imprint of such a type-face of "in" would become rather indistinguishable from an "m," as still more—its carbon copies would be. The new shape of the type-face of the digraph "in," as shown in Fig. 1 at the end of the compressed version of the word "interesting," is characterised in this, that the lower part of the first of the two upright lines of the "n" is omitted. Therefore, a wide additional cavity, opening downwards, is created—on the type-face—interrupting the digraph's outline. That new shape of the type-face of the "in," shown also in Figures 4 to 12, will be obviously less subject to clogging-up with dirt, will be easier to clean, and its carbon copies will be clearer. The same novel way of re-shaping is applied to the trigraph "ing," resulting in a similar improvement of functions performed by the type-face of that combined character.

These novel shapes of "in" and "ing" are also shown in the keyboards of typewriters, as presented in Figures 4–11. The novel shapes of type-faces for "in" and "ing" are also less subject to clogging up and they are easy to clean.

In the same Figures 4–11 also a novel way of re-shaping the digraphs "th" and "ch"—on their type-faces—is shown, applicable—in accordance to the invention—also to such trigraphs as "sch" and "ich"—for the German language—of which "ch" is a part.

Re-shaping of the type-face for the digraph "th" is effected in this novel way that the lower part of the first straight line of the "h," the longer one, is cut out whereby a wider cavity, opening downwards, is created in the type-face. The same operation, of cutting out a part of the customary shape of "h," is performed on type-faces for the digraph "ch" and the trigraphs "sch" and "ich"—for the German language. The novel shape of the small "c" is used—a half-circle or a half-ellipse—as shown in Figures 4–12.

These novel shapes of digraphs and trigraphs are all less subject to clogging up, are easier to clean and produce clear carbon copies. Therefore, for typing of typescripts of a compressed width, their type-faces thus transformed are becoming better tools for producing typescripts.

Advantages connected with the use of compressed typescripts, demonstrated in Figures 1, 2 and 3 are to be attained in full only by applying type-faces re-shaped in novel ways described above.

I presume that digraphs and trigraphs, thus re-shaped, are to be found in old hand-produced books, or printed ones, but the introduction of these shapes for type-faces of modern typewriters is a novelty and produces new and formerly unknown effects in their functioning.

Typescripts, compressed in width, as those shown in Fig. 3, may be written on typewriters represented in the drawings—by their keyboards—and described in connection with Figures 8 and 10.

Fig. 1 of the drawings demonstrates the production—in typescript—of samples of some English words and expressions, shown on the background of as many "m" characters as the number of actions—on the key-cap—which is needed for producing these words in conventional typescript.

First we see the word "interesting" typed in the conventional way, in eleven actions. Underneath the "tachygraphic" and short-space version of that word is shown. It has been produced in five actions only. The first four strokes produce the four digraphs—"in," "te," "re," "st." The last action produces a trigraph—the "ing" suffix.

Next, we see the conventional, and—underneath—the novel reproduction of the expression "The New Look of Typing." Below we see the word "thing," whose conventional production requires five strokes. Tachygraphically it is typed in two.

Below the tachygraphic texts, each of the actions needed is shown in symbols. Thus an "l" indicates an action producing a single small letter, a sign, or a blank space; a "d" indicates actions producing digraphs, and an "m" actions producing trigraphs or other multigraphs.

In Fig. 2, samples of texts are given demonstrating more extensively how this my invention may be applied, in particular: how it becomes possible to compress, into a short space, a single line of typescript, such texts as are shown there. The first of these two texts is "Capacity for creative thinking is a relatively rare inborn talent . . . essential in original research. Advance in science . . ." The second text indicates the "Journal of the Electrochemical Society, Baltimore, March 1948," where the first phrase was found.

Parts of both texts in conventional typing, are reproduced in proximity of the exemplifying novel typescripts. The comparison of the conventional texts with the novel ones, shows the difference and demonstrates how much also the visual legibility—of whole words—has been improved as well. These condensed texts can be typed either by as many actions as are needed on conventional typewriters, or they can be typed tachygraphically, if digraphs are used—shown in Figures 8 and 10.

In Fig. 3 some examples are shown of applying the invention to languages other than English.

In Fig. 4 an example of a semi-tachygraphic typewriter is represented by its keyboard chart embodying some novel features of this invention—adapted for the English language—and arranged with the least deviation from the conventional fashion. Only six digraphs are included—"th," "ch," "in," "is," "ed," "st"—and two quasi-digraphs, the "e" and the "s" followed by blank spaces—marked on the key-caps by a crossed "o."

The "tachygraphic effect" produced by any of the typewriters shown in the drawings, in comparison with single-letter arrangements, may be calculated on the tables given in Fig. 12 and described in this connection. For the typewriter shown in Fig. 4 the "tachygraphic effect," representing economy in actions and in time, amounts to nearly eleven per cent.

Figure 5:
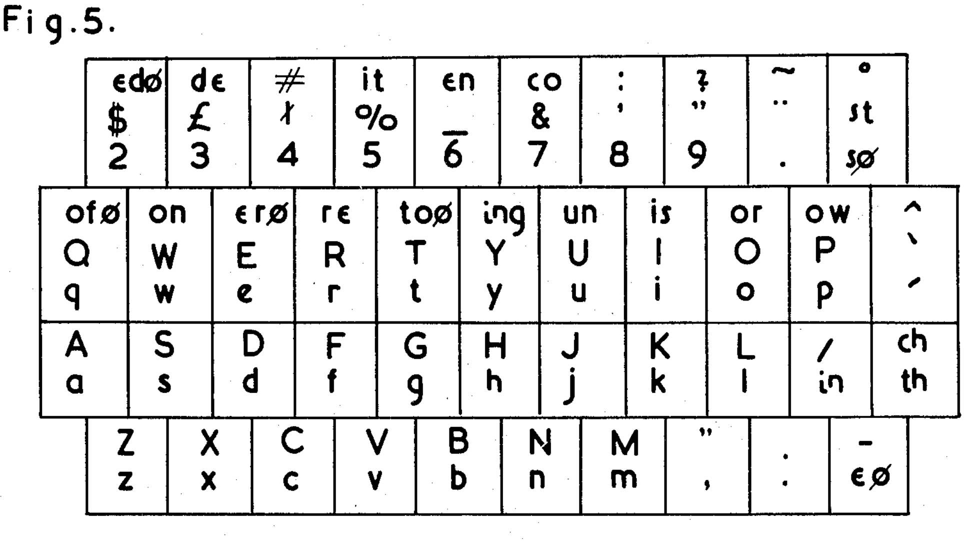

In Fig. 5, an example of a multilingual tachygraphic typewriter is represented by its keyboard chart, characterised in this that on some type-bars a third level—third "case"—of characters is added on the top of some type-bars. The top part of the type-bars, on which the novel multigraphs appear—in the "third case"—must be wider in order to accommodate type-faces of multigraphs, than the lower part of the type-bars on which room is required only for the "m-size" type-faces.

This increase in width, for the "third case" type-faces, may be attained by offsetting the additional width of the type-bar—in this level only—rightwards. This can be conveniently done only on every second type-bar.

The drawing—Fig. 5—shows the adaptation of a 42-key American "Corona" typewriter, a conventional one, for the purpose of embodying some of the novel features of my invention. In that example, the first type-bar on the left hand belongs to the key-cap with the letter "q," in the second row. In the "second case" it bears the capital "Q," and in the top level—third "case"—a novel trigraph composed of two letters—the "of" to be produced with the blank space thereafter.

The type-face of that quasi-trigraph occupies, in the top part of the type-bar, the width of two spaces, of two type-bars, that of its own bar and key—with the letter "q" and in addition, that of the next type-bar, that one with the letter "a." Similarly, the third type-bar, counting from the left, with the numeral "2" in the bottom level, bears on its top level a novel quasi-trigraph composed of the two letters "ed" with the following blank space. The type-face of that quasi-trigraph—a double-spaced one—extends over the next type-bar with the letter "z."

The fifth type-bar, counting from the left, with the letter "w," bears in the "third case" the novel—uncompressed—digraph "on." Its type-face spreads—in the third level—over two bar spaces, that of its own and additionally that of the letter "s."

Similarly, every second type-bar, all those with odd numbers, counting from the left, that is with characters "q," "2," "w," "3," "e" and so on, may be double-spaced in the "third case." Consequently type-bars with even numbers, located between the former ones, have room only for the two lower levels of characters—the small letters and the capitals, in the first "case" and the second "case." They can not be extended upwards, to the third "case."

In that example—Fig. 5—all the odd type-bars "q," "2," "w" and so on, are governed by key-caps located in the two upper rows of the keyboard. They can have the double-spaced type-face in the third "case." All the "even keys" and type-bars "a," "z," "s," "x" and so on, are governed by key-caps located in the third and the fourth row. They can have only the two conventional levels—two "cases" of characters. In Fig. 5 the contour of the three-level type-blocks, having a rightward extension in the uppermost "case," is shown—schematically—by a dotted line inside the first rectangles of the two upper rows, those with the letter "q" and with the numeral "2." It is understood that all the type-blocks pertaining to key-caps in the two upper rows—Fig. 5—have contours as shown by the dotted outlines mentioned above. The same applies to Figures 7 and 11.

In order to make the typewriter "multilingual" accents and the like were added. Also a Polish crossed "l" was added, above the numeral "4," representing the sound half way between the pronunciation of a "w" and an "l" in the word "wealth." The addition of that crossed "l" causes that this typewriter may be used for reproducing phonetically also other languages in which this sound appears: Russian, Ruthenian, Ukrainian, and so on.

Figure 6:
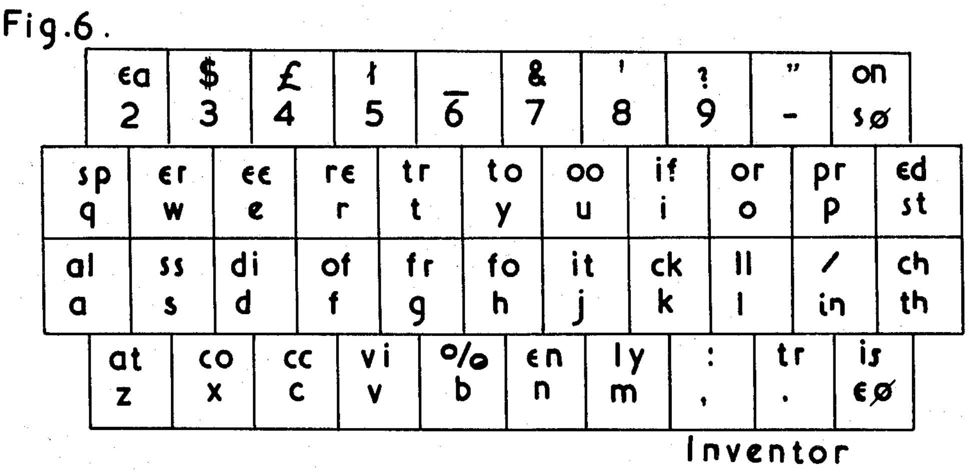

In Fig. 6 a further example of a tachygraphic typewriter is represented by its keyboard chart, fitted out with small letters only. The place usually occupied by capitals—the "second case"—accommodates a multiplicity of digraphs, all of them compressed to the uniform "m"-size. The rapidity of writing is considerably increased by the abundance of digraphs. For many purposes capitals can be done away with in typescripts. The capital "I" is an exception, it can be substituted by the small letter "l."

Figure 7:
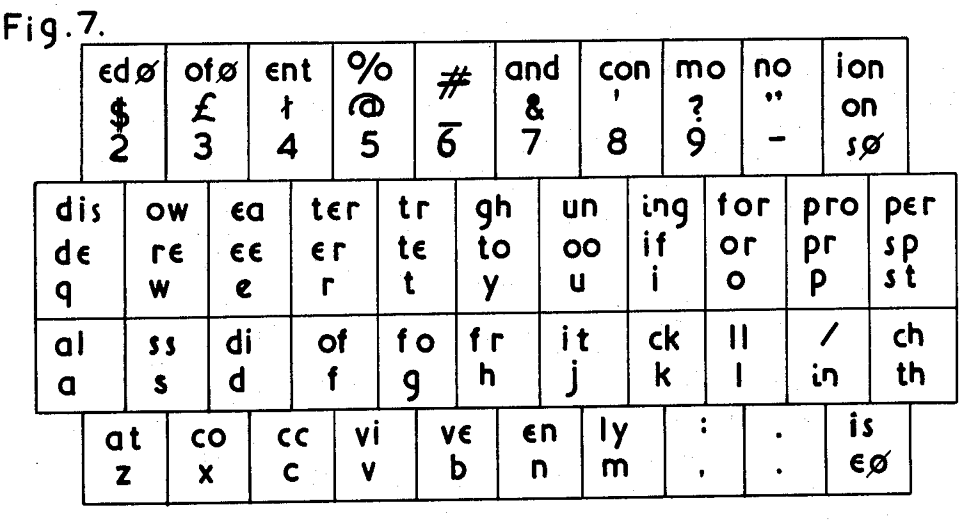

In Fig. 7, another "small-letter-only" tachygraphic typewriter is represented by its keyboard chart. The arrangement possesses all the advantages and properties described in connection with Fig. 6, but a third level—third "case"—of characters has been added on type-bars operated by key-caps located in the first and the second row, in the keyboard. Digraphs, which have taken the place of captials, in the second "case" are compressed—in type-faces—to the "m"-size. The third "case" accommodates digraphs requiring a greater width and other multigraphs. The third "case" is double-spaced. Implications of that arrangement were described in connection with Fig. 5. Digraphs and trigraphs are located—preferably—in "families" in proximity of a "root letter." That feature contributes to the rapidity of writing, but is not included in the scope of the invention.

In Figures 8–11 forms of application of the invention are shown which represent a still farther-going departure from the arrangement of type-faces on conventional typewriters, and pursue more thoroughly principles of this invention. These are typewriters which may produce such harmonious and compressed typescripts as those shown in Figures 1–3.

Arrangements shown hitherto—Figures 4–7—had still the conventional location of the two "fat" small letters, the "m" and the "w." These letters were included in the set up of all the small letters—in the "first case"—consequently, such "lean" small letters as the "i" or the "l" had to occupy—in their type-faces—the same width and space, on the writing paper, as the "m" or the "w" did. Therefore typescripts produced on typewriters of that kind could be less harmonious than desired, and not the full use of the introduction of digraphs and of multigraphs was made.

Figure 8:
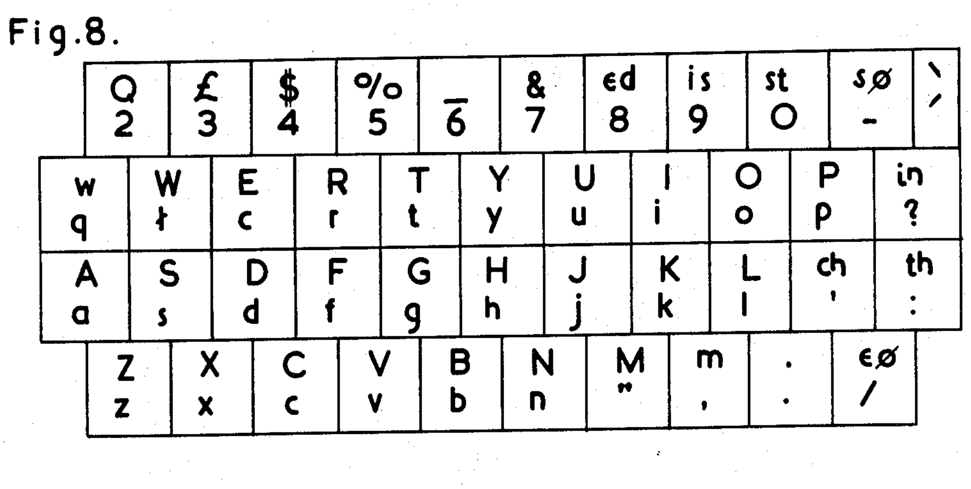
Figure 9:
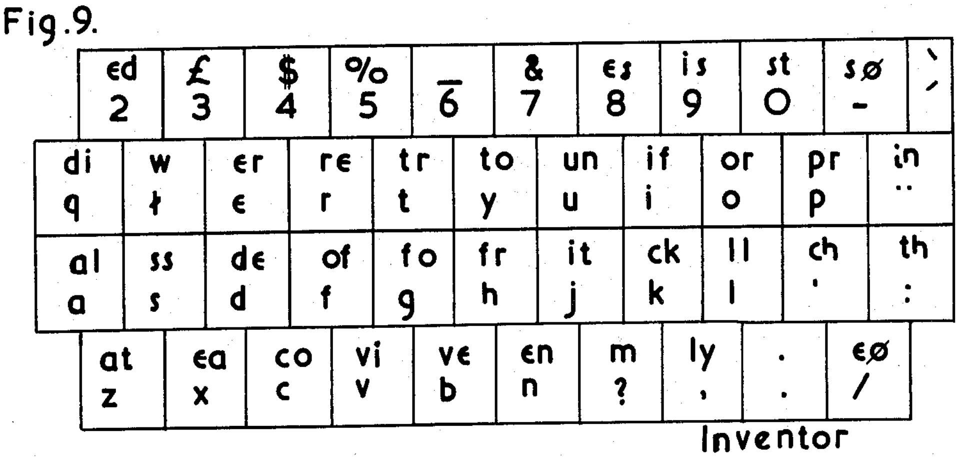

In arrangements represented by Figures 8–11 the two "fat" letters—small "m" and small "w"—are removed from the bottom level—the "first case"—of the type-bars, which level is occupied by all the other small letters, the "lean" ones. These two small letters are located—in Figures 8–11—in the second level—"second case"—in that one customarily occupied by capitals. Furthermore, while the spacing in the "second case" is now to be that of the "m"-size, the "first case," the bottom level, can now have a considerably shorter spacing, preferably a "half 'm' size" quite sufficient for the lean small letters. If now digraphs are to be located in the "second case"—with an "m"-spacing—their impressions on the paper may not differ from the impressions of two single letters from the "first case." Just in these arrangements the novel shapes of type-faces of the small letters "e," "s" and "c" and of the digraphs—as described above—will show their full value for the production of compressed typescripts, with clear carbon copies. As shown in Figures 9 to 11, inclusive, all the single "lean" small letters in the lowest level—"first case"—being reduced in width and spacing in comparison with the "m," are centralized inside the left half of the location attributed to the "m" and to digraphs on the respective type-blocks.

The typewriter represented by its keyboard chart shown in Fig. 8 shows the least deviation from conventional modern typewriters. Novelty consists here in this, that while all the small letters except the two fat ones, the "m" and the "w," are in their usual locations, these two fat small letters are taken to the "second case," and share with the capital letters, located there, the privilege that when type-faces of that second case are operated, the movement of the platen roller, and of the writing paper, is double of the short-letter spacing attributed to the "first case" in the bottom level.

In Fig. 9 an example of a "small letters only" tachygraphic typewriter is represented by its keyboard chart. Most of that which has been said in connection with Fig. 6 is applicable also here, the main difference—and the novelty—lies in this, that the two "fat" small letters, "m" and "w," are eliminated from among other small letters of the bottom level, the "first case," and are moved to the "second case." Consequently, a shorter letter-spacing can be introduced for the "first case" containing now only the "lean" small letters. It means that on that typewriter more letters to the inch can be written than on typewriters in which all small letters must have the larger "m-spacing."

For the "second case" a double character-spacing is foreseen here, similarly as it has been described in connection with Fig. 8. Capital letters in the "second case" have been replaced by digraphs composed of two small lean letters each. As 34 digraphs are accommodated, an increased rapidity of writing is assured.

In Fig. 10 an example of a "double-shift" tachygraphical typewriter, represented by its keyboard chart, is shown. Its type-bars are equipped with three "cases" each, in three levels of type-faces, as they are shown on the key-caps in the keyboard chart of the drawing. The "first case," in the bottom-level, contains the usual set of small letters, except the "m" and the "w." Capital letters are, preferably, moved up to the "third case" in the top level, together with symbols and signs. The "second case" in the middle level, freed from capitals, provides ample room for the two "fat" small letters—"m" and "w"—and a wide variety of digraphs and quasi-digraphs, such ones of course which may be conveniently compressed to the space of an "m." These digraphs—41 of them—assure a considerable increase of the "tachygraphic effect," that is, of the rapidity of writing of texts compressed in space.

The shortened letter-spacing allotted to the "first case," the bottom level, implies all the advantages specified above in connection with Fig. 8 and Fig. 9. The spacing of both upper levels, of the second and third "case," is longer, preferably double of the short letter-spacing of the "first case."

In Fig. 11 a further example of a "small letters only" tachygraphic typewriter, represented by its keyboard chart, is shown, embodying principles of this invention in a similar way as it has been specified in connection with Figures 5 and 7. The main difference from the former examples is that the two "fat" small letters—"m" and "w"—are moved up, from the first "case" to the second and the spacing is different in each one of the three "cases." The "first case" may have a very short spacing, as the "fat" small letters are removed. The "second" must have a longer spacing, the "m"-size spacing, and the "third case" needs a still longer spacing for the trigraphs accommodated there, together with other rather long combined characters, such as "ow" and "em." Preferably, the spacing of the "second" may be double of the short spacing of the "first case" and the spacing of the "third case" the triple of it.

Advantages described in connection with Figures 8, 9 and 10 apply also to the example shown in Fig. 11. The tachygraphic effect of the arrangement, calculated in accordance with the table given in Fig. 12 exceeds 25 per cent.

In Fig. 12 tables are shown on which the selection of digraphs and trigraphs was based for inclusion on tachygraphic typewriters shown in Figures 4–11. These tables are the result of analysing texts containing one thousand words in English. For this analysis, 500 words—counted words—of American texts, of various origins and covering various subjects, were chosen. For producing these 500 words 2877 "actions," that is: letters, signs and blank spaces, were needed. Results of that analysis are shown in the second line of the tables, for each particular multigraph.

The other 500 words were various texts of British origin for whose production 3177 "actions" were needed. Results of analysing these British texts are shown in the third line of the tables. The fourth line gives results for all the 1000 words summed up. The "per mille" is calculated in proportion to the 6054 "actions" actually used for producing the 1000 words and these "per mille" indexes are shown, for each particular multigraph at the bottom of the tables.

In order to calculate the "tachygraphic effect" of each tachygraphic typewriter shown in Figures 4–11 the "indexes" of all multigraphs included were summed up. Duplication, such one as occurring in the case of an "in" and an "ing," had to be avoided.

By using specialized tachygraphic typewriters, according to the invention, and adapted for various purposes, the economy—the tachygraphic effect—may be raised to over 50 per cent, for specialized languages—or slangs—such as the language of economists, scientists, technicians, strategists, theologians and so on.

Instances and conditions may arise in which arrangements shown—by way of examples—in Figures 4–11 may be varied without departing from the principles of the invention. For instance it may be expedient to locate characters shown in these examples in the bottom level in some other level. I do not desire to be understood as limiting myself to the specific provisions, arrangements, shapes, constructions or other features shown in the drawings and described, but reserve the right of varying the same in adapting my invention to varying conditions of use without departing from the principles of this invention.

Having now particularly described and ascertained the nature of my said invention and in what manner the same is to be performed, I declare that what I claim is:

1. A modern typewriter of the description hereinbefore defined—characterised in this, that inside the spacing, and the width of the type-face of a "fat" small letter—the "m" or the "w"—type-faces of two other small Latin letters, the "lean" ones, are accommodated on single type-blocks, each with the normal "m-spacing," each carrying a compound type-face compressed to the "m-size" combining—in a digraph—such two "lean" small Latin letters which form digraphs frequently occurring in the language, and on separate type-blocks with a spacing reduced to one half of the "m-spacing," each carrying the type-face of one "lean" Latin small letter compressed in width and centralized inside the left half of the location attributed to the "m" and to digraphs on respective type-blocks.

2. A typewriter as set forth in claim 1 with three levels—three "cases"— of characters in its keyboard on its typebars—characterised in this, that in addition to type-faces of "lean" small Latin letters compressed in width and of compound type-faces of compressed digraphs, type-faces of trigraphs or of some longer digraphs are added on certain type-blocks, these type-blocks having a rightward extension in the uppermost level—"third case"—to accommodate said trigraphs or longer digraphs and being such type-blocks only as are separated, in their rest position, the one from the other, by at least one type-block with type faces in two "cases" only, thus permitting said extension of the type-face in the uppermost level—"third case"—to be offset in width, in the rest position, over the neighbouring two-case type-block, that uppermost part of each third-case type-block, where the extension is located, having a width double that of type-blocks in the lower two "cases" and a corresponding spacing.

3. A typewriter as set forth in claim 2 with three levels —three "cases"—of characters in its keyboard and on its type-bars—characterised in this, that on all type-blocks of its type-bars, or on a part of them, in the middle level—middle "case"—type-faces of capital letters are replaced by digraphs having the two "lean" small Latin letters, forming the digraph, compressed to the "m-size" width, and all the type-faces used in the two lower levels—lower "cases"—including type-faces of single small letters, retain the customary "m-size" width and spacing.

4. A typewriter as set forth in claim 1 with three levels —three "cases"—of characters in its keyboard and on its type-bars—characterised in this, that in addition to type-faces of small Latin letters compressed in width, or of compound type-faces of compressed digraphs, type-faces of trigraphs or of some longer digraphs are added on certain type-blocks, these type-blocks having a rightward extension in the uppermost level—"third case"—to accommodate said trigraphs or longer digraphs and being such ones only as are separated, in their rest position, the one from the other by at least one type-block with type-faces in two "cases" only, thus permitting said extension of the type-face in the "third case" to be offset—in width—in the rest position, over the neighbouring two-case type-block, that uppermost part of each third-case type-block, where the extension is located, having a width approximately equal to three type-faces of such "lean" small letters as have been compressed to the "half-m" size, on separate type-faces or in digraphs, and having a corresponding spacing, a triple one.

5. A typewriter as set forth in claim 4 with three levels —three "cases"—of characters in its keyboard and on its type bars—characterised in this, that in its keyboard and on its type-bars, type-faces of all small letters except the "m" and the "w" are in the first level—"first case"—thus permitting a compression in width of the type-faces of all these "lean" small letters of that "first case" and a corresponding reduction of their spacing, each of them being centralized inside the left half of the location attributed, on the respective type-blocks, to an "m," the type-faces of the two "fat" small letters—the "m" and the "w"—being transferred to the "second case," whose type-faces, including capitals and some digraphs, or with the capitals replaced by digraphs, all capitals or some of them, have the full "m-size" width and a corresponding spacing, double of the spacing allotted to the "first case," while the "third case," that one with trigraphs, has a triple spacing in comparison with the "first case."

6. A typewriter as set forth in claim 1 with two levels —two "cases"—of characters in its keyboard and on its type-bars—characterised in this, that the customary arrangement of keyboard and type-bars is modified by the introduction of a few digraphs only having their type-faces, consisting of two combined "lean" small Latin letters, compressed to the "m-size" width, such digraphs only which most frequently occur in the language, for English for instance "th," "ch," "in," "is," "st" or "ed" including quasi-digraphs such as an "s" or an "e" followed by a free space, while type-faces of all single small letters in the one "case" and of capitals in the other "case" retain the customary "m-size" in width and in spacing.

7. A typewriter as set forth in claim 1 with two levels —two "cases"—of characters—characterised in this, that in its keyboard and on its type-bars the customary type-faces of all capital letters, or a part of them, are replaced by type-faces of digraphs consisting of two "lean" small letters compressed to the "m-size" width, including quasi-digraphs such as a small "e" or a small "s" followed by a blank space, while all the type-faces used—in both "cases"—including type-faces of single small letters, retain the customary "m-size" in width and in spacing.

8. A typewriter as set forth in claim 1 with two levels —two "cases"—of characters in its keyboard and on its type-bars—characterised in this, that type-faces of all "lean" small letters, that is of all letters of the Latin alphabet except the "m" and the "w," are in one level—one "case"—each being centralized inside the left half of the location attributed, on the respective type-blocks, to an "m," each being compressed approximately to the "half-m" size and each having a "half-m" spacing, while type-faces of the two "fat" small letters—the "m" and the "w"—are transferred to the other level—other "case" —all characters of that other "case" having the appropriate "m-size" in width and the "m-spacing."

9. A typewriter as set forth in claim 8 with two levels —two "cases"—of characters in its keyboard and on its type-faces in the type-bars—characterised in this, that in the second level—second "case"—the customary type-faces of all capitals, or of a part of them, are replaced by type-faces of digraphs having the type-faces of two combined "lean" small letters compressed to the "m-size" width, including type-faces of quasi-digraphs such as a small "s" or a small "e" followed by a blank space, all these digraphs of the second "case" having the same spacing as the "fat" small letters—the "m" and the "w"— transferred to that second "case."

10. A typewriter as set forth in claim 1 with three levels—three "cases"—of characters, with type-blocks of all the type-bars having type-faces in each one of the three "cases"—characterised in this, that in its keyboard and on its type-bars, type-faces of all the small letters except the "m" and the "w" are in the first level—"first case"—thus permitting a compression in width of the type-faces of all these "lean" small letters of that "first case" and a corresponding reduction of their spacing, each of them being centralized inside the left half of the location attributed, on the respective type-blocks, to an "m," the type faces of the two "fat" small letters— the "m" and the "w"—being transferred to the "second case," that "second case" and also the "third case" having also all the rest of their type-faces—digraphs, capitals and signs—of the "m-size" in width and a corresponding spacing, double that allotted to the "first case."

References Cited in the file of this patent

UNITED STATES PATENTS

| | | |
|---|---|---|
| 346,104 | Howard | July 27, 1886 |
| 519,320 | Clark | May 8, 1894 |
| 552,774 | Perry | Jan. 7, 1896 |
| 616,655 | Engle et al. | Dec. 27, 1898 |
| 773,894 | Reamer | Nov. 1, 1904 |
| 904,982 | McKeever | Nov. 24, 1908 |
| 907,730 | Brown | Dec. 29, 1908 |
| 917,959 | Martin | Apr. 13, 1909 |
| 1,100,844 | Riches | June 23, 1914 |

FOREIGN PATENTS

| | | |
|---|---|---|
| 366,846 | Germany | Jan. 12, 1923 |
| 424,416 | France | May 13, 1911 |
| 596,555 | Great Britain | Jan. 6, 1948 |